(12) United States Patent
Lin et al.

(10) Patent No.: US 7,697,284 B2
(45) Date of Patent: Apr. 13, 2010

(54) FRAMEWORK STRUCTURE FOR COMPUTER MAIN FRAME

(75) Inventors: Te-An Lin, Taipei Hsien (TW); Chih-Hsiung Chen, Taipei Hsien (TW); Wu-Nan Wang, Taipei Hsien (TW); Cheng Tu, Taipei Hsien (TW); Ching-Tang Lin, Taipei Hsien (TW)

(73) Assignee: AOPEN, Inc., Hsichih, Taipei Hsien (TW)

( * ) Notice: Subject to any disclaimer, the term of this patent is extended or adjusted under 35 U.S.C. 154(b) by 363 days.

(21) Appl. No.: 11/704,380

(22) Filed: Feb. 9, 2007

(65) Prior Publication Data
US 2007/0253159 A1    Nov. 1, 2007

(30) Foreign Application Priority Data
Mar. 27, 2006    (TW) .............................. 95110581 A

(51) Int. Cl.
*G06F 1/16*    (2006.01)
*H05K 7/16*    (2006.01)
*A47B 81/00*    (2006.01)

(52) U.S. Cl. ............... 361/679.6; 361/725; 361/679.37; 312/223.2

(58) Field of Classification Search .......... 361/683–685, 361/724–727, 679.01–679.45, 679.55–679.59; 312/223.1, 223.2
See application file for complete search history.

(56) References Cited

U.S. PATENT DOCUMENTS

| 5,107,400 | A  | * | 4/1992 | Kobayashi | .................. 361/685 |
| 6,115,243 | A  | * | 9/2000 | Horii | ..................... 361/679.09 |
| 6,700,776 | B2 | * | 3/2004 | Bang et al. | .................. 361/683 |
| 6,816,391 | B2 | * | 11/2004 | Davis et al. | ................. 361/818 |
| 7,420,812 | B2 | * | 9/2008 | Chen et al. | ................... 361/724 |

* cited by examiner

*Primary Examiner*—Jayprakash N Gandhi
*Assistant Examiner*—Nidhi Desai

(57) ABSTRACT

A framework structure for a computer main frame, comprises an outer frame and an inner frame in which the inner frame is combined with an inner portion of the outer frame. A rear end of a first plate is pivotally connected to a bottom of the inner frame, and a front end of the first plate is combined with a downside of a bottom of the inner frame and positioned on a downside of a first hole of the inner frame. A hard drive can be locked on an upside of the first plate. Bottom ends of a plurality of shafts are respectively combined with the inner frame so as to use upper ends of the shafts to combine with a motherboard to allow the hard drive to be positioned below the motherboard.

6 Claims, 6 Drawing Sheets

FRAMEWORK STRUCTURE FOR COMPUTER MAIN FRAME

BACKGROUND OF THE INVENTION

1. Field of the Invention

The present invention relates to a personal computer, and more particularly to a multi-configuration stackable modular personal computer structure.

2. Description of the Prior Art

U.S. Pat. No. 6,118,663 discloses a multi-configuration modular computer; it comprises a display module, a keyboard and pointer device module, a motherboard and power module, a mass-storage module, and an expansion module. A user can stack and assemble different uses of devices such as a LCD displayer, a notebook computer and a desktop computer by selecting and combining different modules.

Taiwan Patent Publish No. 490,121 discloses a outer frame structure capable of integrating a modular computer comprising a plurality of cabin bodies. Elements such as semi-system cabin and a displayer cabin are installed in the cabin bodies. The semi-system cabin is constituted by a outer frame, an inner seat and a panel. A rear end of the outer frame has a hollow section to form a hollow connection space. A plurality of connection elements is installed in a suitable position of the outer frame. The inner seat is installed in the outer frame. A rear end of the inner seat has a hollow section corresponding to the hollow section of the outer frame to form a hollow connection space. The panel is combined with a front end of the inner seat. The displayer cabin includes a main display device and an outer frame is mutually moveably connected. A plurality of connection elements is installed in a suitable peripheral position of the outer frame. There is a connecting wires space between the outer frame and the display device which corresponding to the connecting wires space of other cabin. The semi-system cabin and the displayer cabin are combined with each other stably through the connection elements so as to allow the whole to have an identical length and width, and have corresponding spaces for providing various connecting wires and terminals to be disposed in a connection space at a rear side of each cabin.

According to the modular computers disclosed in the US patent and Taiwan patent mentioned above, without allowing a hard drive to be positioned below a motherboard to benefit a space disposition above the motherboard and be convenient on the maintenance or the replacement of the hard driver.

SUMMARY OF THE INVENTION

For further altering a framework structure for a modular personal computer that allows a hard drive to be positioned below a motherboard, the present invention is proposed.

The main object of the present invention is to provide a framework structure for a computer main frame allows the hard drive to be positioned below the motherboard to benefit a space disposition above the motherboard and be convenient on the maintenance or the replacement of the hard driver.

Another object of the present invention is to provide a framework structure for a computer main frame facilitates to combine each framework securely.

The present invention relates to a framework structure for a computer main frame, used for allowing a hard drive to be positioned below a motherboard, comprising: an inner frame, which is combined with an inner portion of the outer frame, a bottom thereof having a first hole and a plurality of holes; a first plate, a rear end thereof is pivotally connected to a bottom of the inner frame; a front end thereof is combined with a downside of the bottom of the inner frame and positioned on a downside of the first hole of the inner frame; whereby, the hard drive is allowed to be combined on the upper side of the first plate and to be pass through the first hole and to be positioned in an inner portion of the inner frame; a plurality of shafts, bottoms thereof are respectively combined with the holes on the bottom of the inner frame so as to use upper ends of the shafts to combine with a motherboard to allow the hard drive to be positioned below the motherboard to benefit a space disposition above the motherboard and be convenient on the maintenance or the replacement of the hard disk driver.

BRIEF DESCRIPTION OF THE DRAWINGS

Further features and other objects of the present invention will become apparent from the following detailed description, taken in conjunction with the drawings and embodiments.

DETAILED DESCRIPTION OF THE INVENTION

Figure 1:
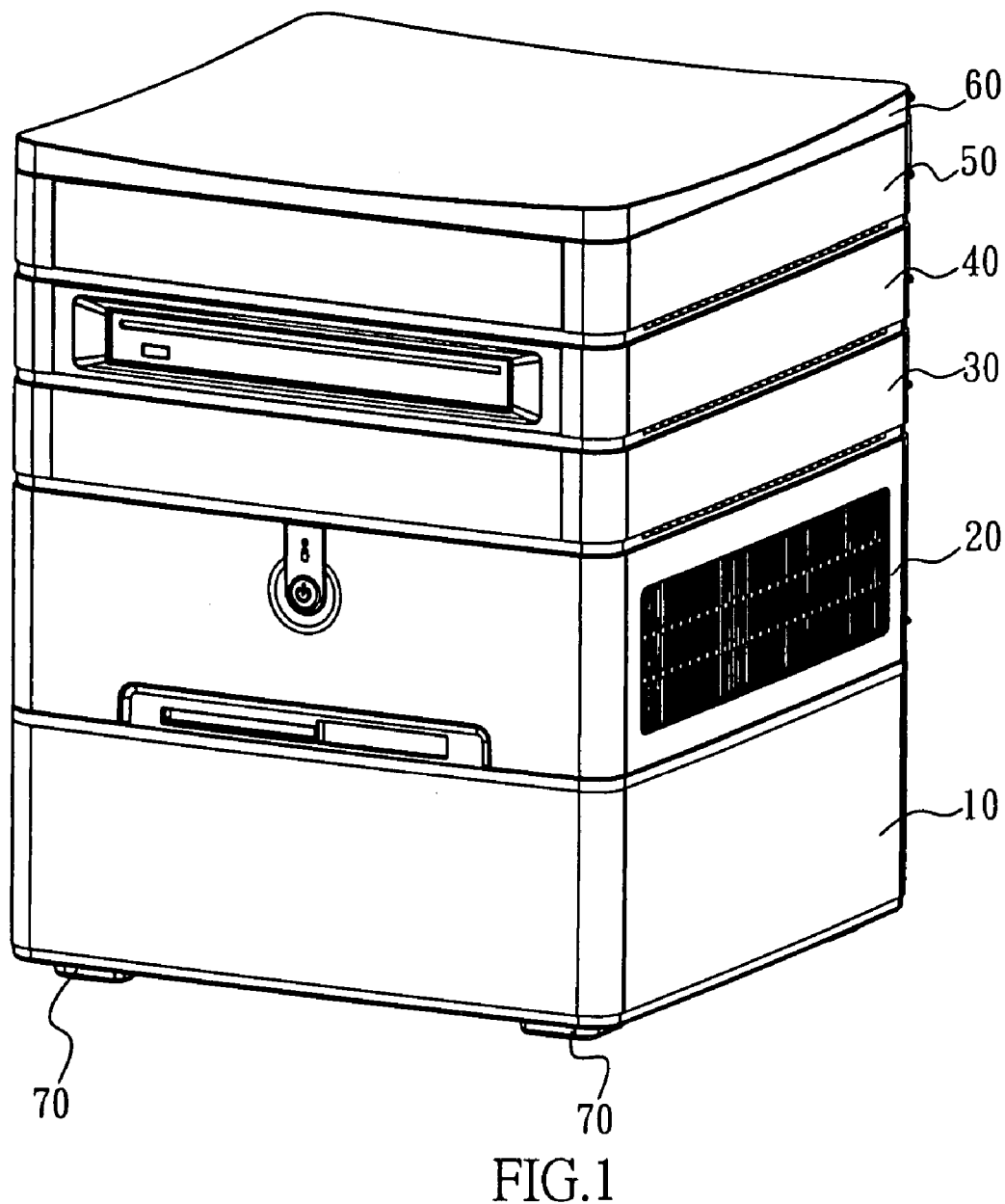
FIG. 1 is a schematic view, showing a framework of a preferred embodiment according to the present invention assembled in a computer main frame.
Figure 2:
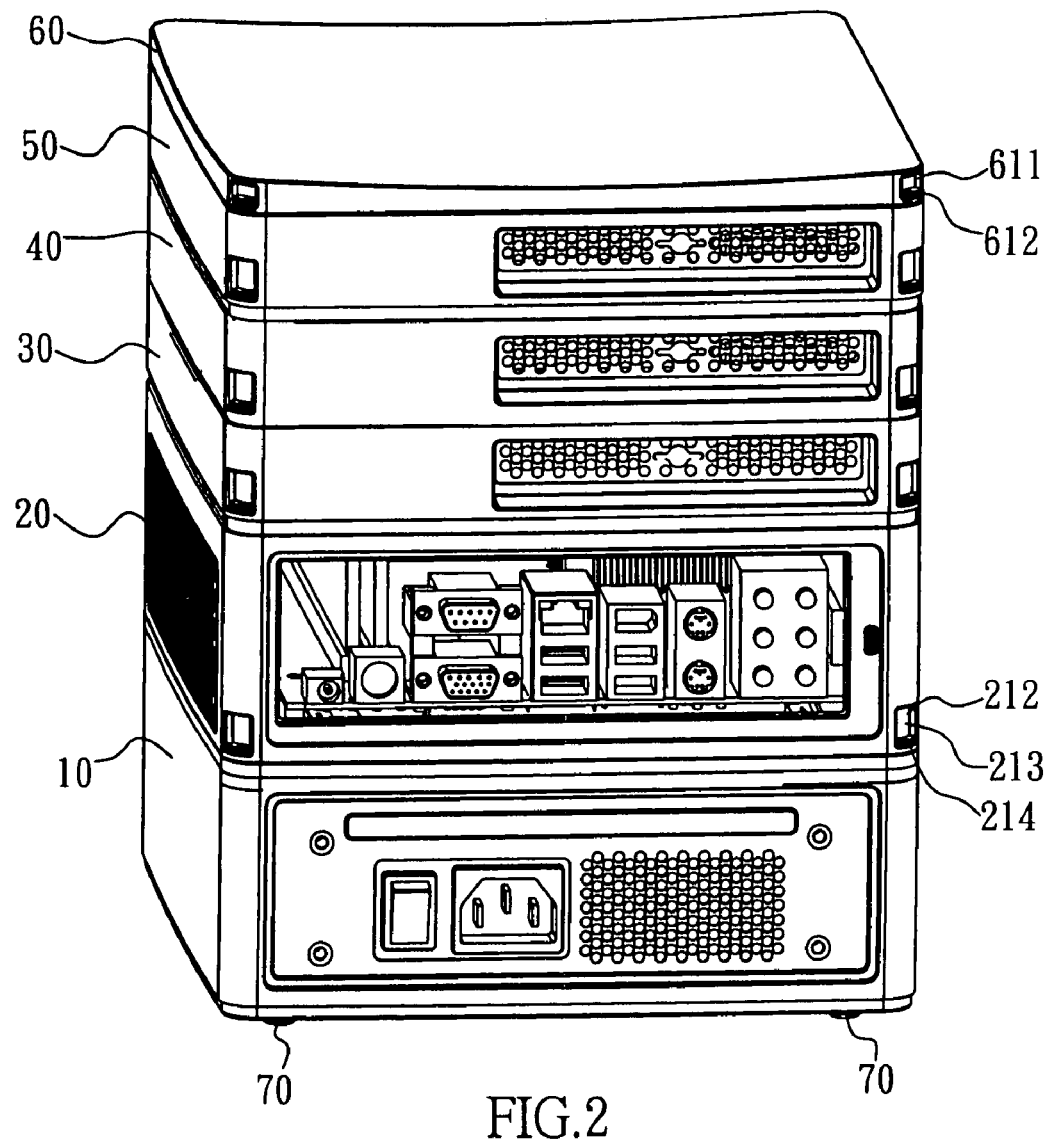
FIG. 2 is another schematic view, showing a framework of a preferred embodiment according to the present invention assembled in a computer main frame.

Please refer to FIGS. 1 and 2. A framework structure for a computer main frame of a preferred embodiment according to the present invention, used for combining a hard drive located under a motherboard and for assembling an individualized computer for need of a user. The computer main frame according to the present invention, comprises a first framework 10, second framework 20, third framework 30 and fourth framework 40, fifth framework 50 and upper cover 60 stacked to combine with each other in a sequence. A downside of the first framework 10 is combined with a plurality of foot rests 70. An upper part of each framework includes a through hole for communicating with the upper framework.

Figures 3A, 3B:
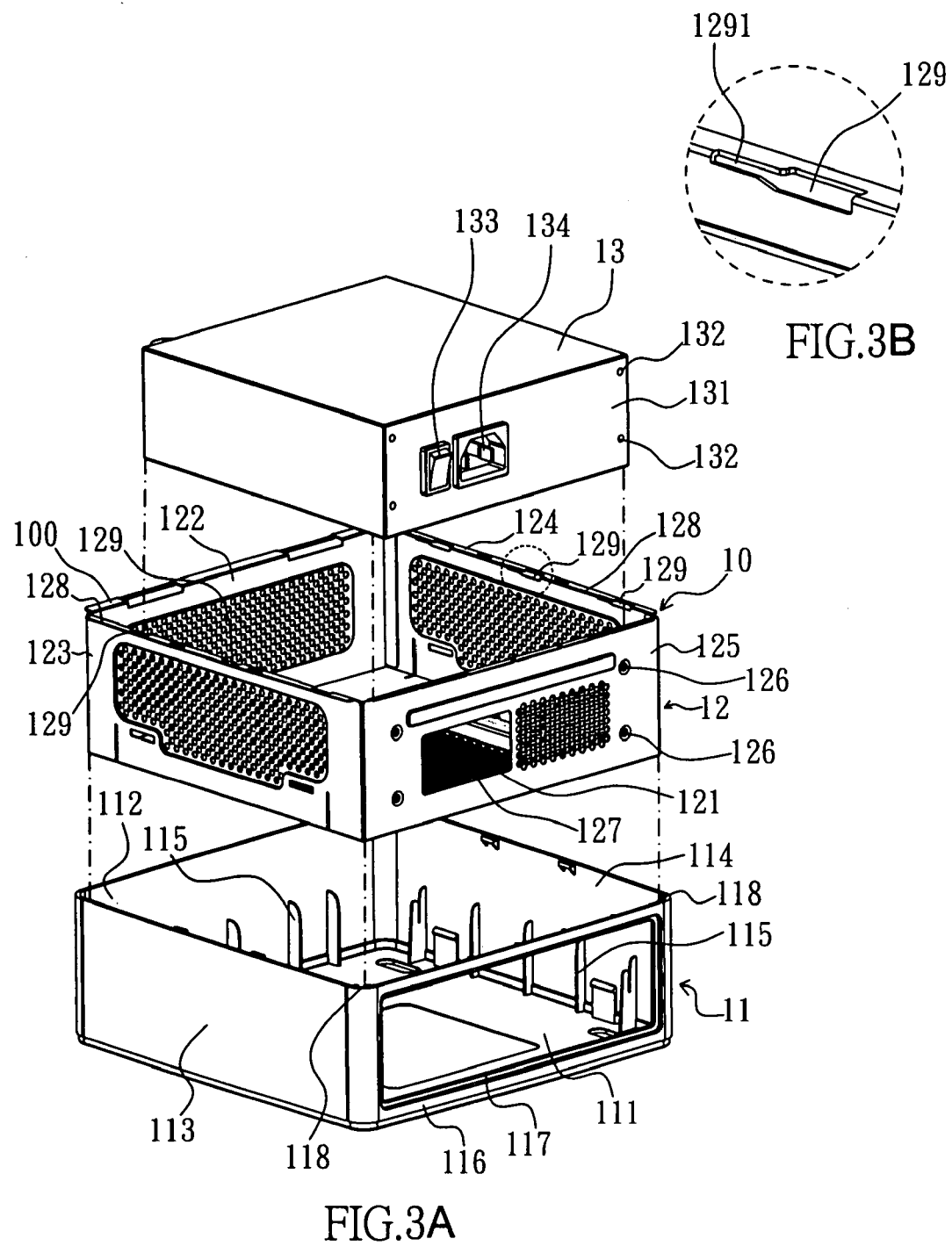
FIG. 3A is an exploded view, showing the first framework of a preferred embodiment according to the present invention.
FIG. 3B is an enlarged perspective view of the portion in the dashed circle in FIG. 3A.

Please refer to FIGS. 3A and 3B. The first framework 10 comprises a first inner frame 12 which is combined with an inner portion of a first outer frame 11. A power supply 13 is combined with an inner portion of the first inner frame 12. A bottom 111 of the first outer frame 11 upholds a bottom 121 of the first inner frame 12. An inner portion of a front side 112, a left side 113 and right side 114 of the first outer frame 11 has a plurality of fins 115 respectively. The fins 115 are respectively propped against a front side 122, a left side 123 and right side 124 of the first inner frame 12. An upper side of a junction of a rear side 116 and the left and right side 113, 114 of the first outer frame 11 has a slot 118 respectively. A rear side 131 of the power supply 13 has a plurality of screw holes 132. A rear side 125 of the first inner frame 12 has a plurality of holes 126 which correspond to the screw holes 132 such that the power supply 13 is joined to the rear side 125 of the first inner frame 12 with screws passing through the corresponding holes 126 and the screw holes 132. There is a space between the front side 122 of the first inner frame 12 and a front side of the power supply 13 to form a through hole 100 for communicating with the upper framework and allowing electric wires to be passed through. The rear side 125 of the first inner frame 12 and the rear side 116 of the outer frame 11 provide a hole 117, 127 respectively which correspond to a connector 134 and a switch 133 of the power supply 13. A top end of the left and right side 123, 124 of the first inner frame 12 provide an outward bending prop-plate 128 for upholding the outer frame of the upper framework. A junction of the prop-plates 128 and the left and right side 123, 124 of the first inner frame 12 provide a plurality of clasp-holes 129 respectively. A front end of the clasp-hole 129 is narrow to form a crevice 1291. A rear end of the clasp-hole 129 is wider than the front thereof.

Figure 4:
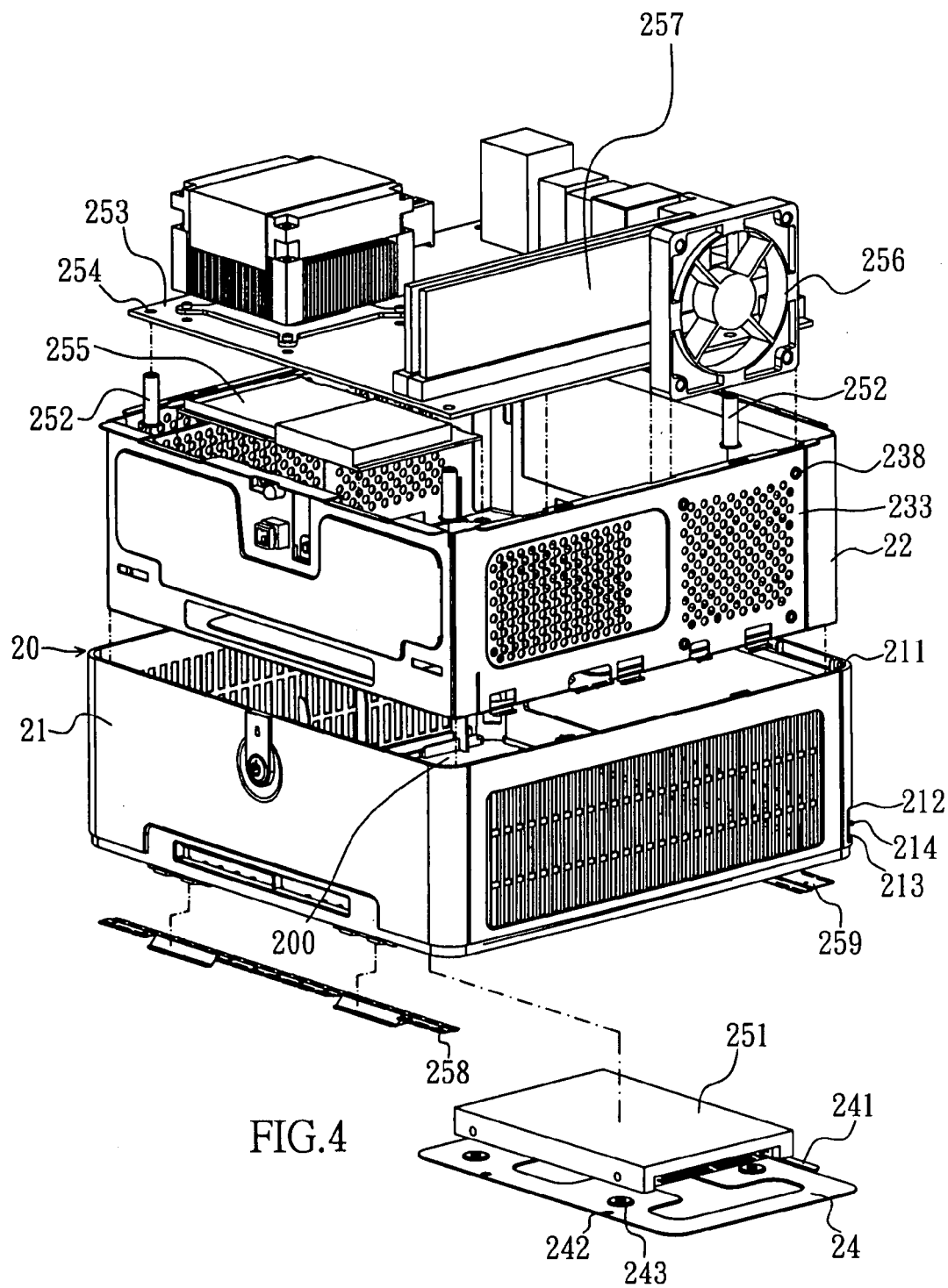
FIG. 4 is an exploded view, showing the second framework of a preferred embodiment according to the present invention.
Figures 5A, 5B:
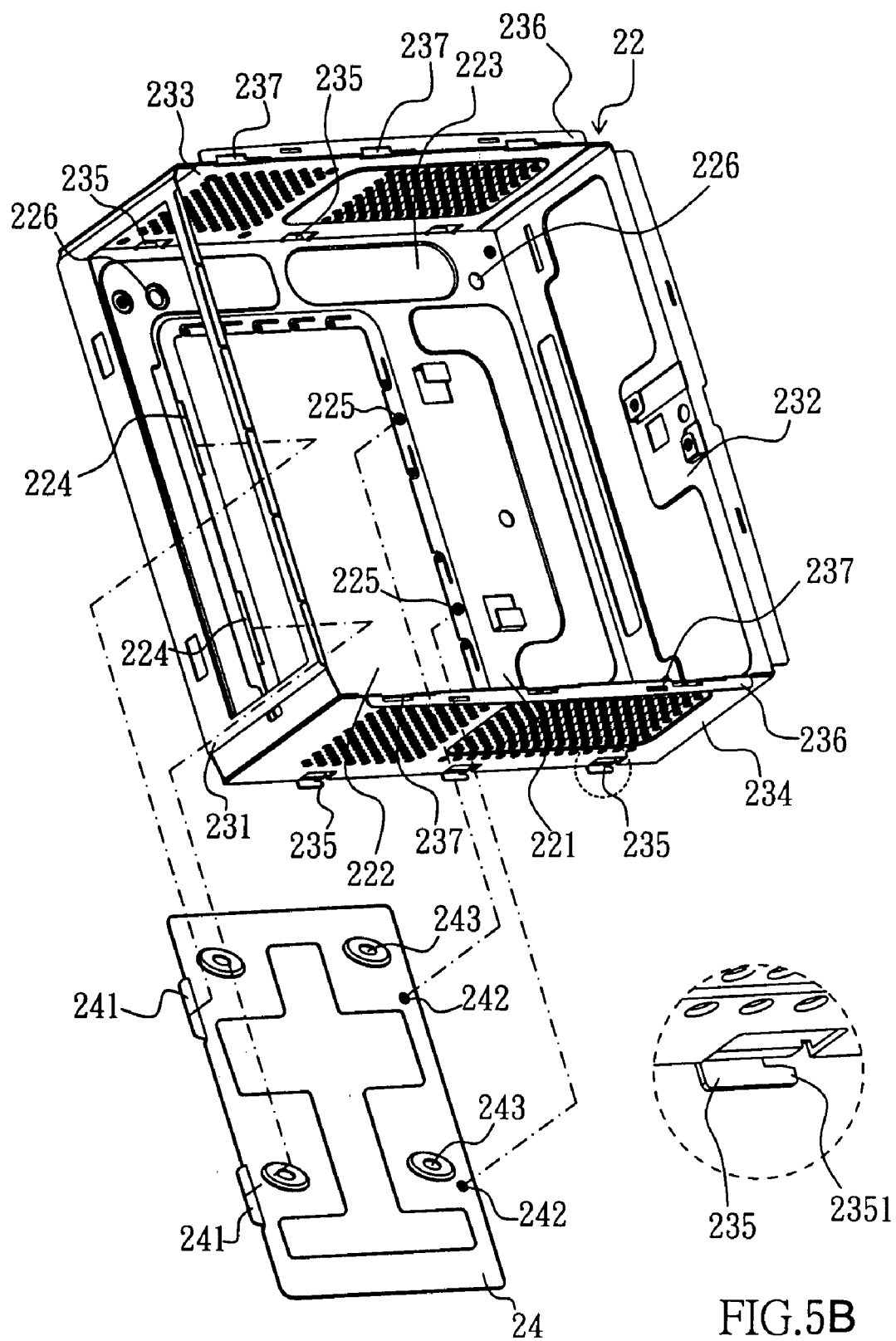
FIG. 5A is an exploded view, showing the second framework of a preferred embodiment according to the present invention.
FIG. 5B is an enlarged perspective view of the portion in the dashed circle in FIG. 5A.

Please refer to FIGS. 4, 5A, 5B and 6. A framework structure for a computer main frame according to the present invention is the second frame 20, includes a second inner frame 22 which is combined with an inner portion of a second outer frame 21. The combination structure of the second outer frame 21 and the second inner frame 22 are approximately same as the combination structure of the first outer frame 11 and the first inner frame 12 as FIG. 3A and 3B shows. But an upper and lower side of the second frame 20 provides a through hole 200 corresponds to the through hole 100 of the first framework 10. Refer to FIG. 5A and 5B; a bottom 221 of the second inner frame 22 has a first hole 222, a second hole 223, a clasp-hole 224, a plurality of screw-holes 225 and a plurality of holes 226. The first hole 222 and the second hole 223 approach the rear side 231 and front side 232 of the second inner frame 22 respectively. The bottom of the left and right side 233, 234 of the second inner frame 22 has an outward extending clasp-ear 235 respectively. The clasp-ear 235 respectively corresponds to the wider area of the rear end of the clasp-hole 129 of the prop-plates 128 as FIG. 3A and 3B show. A front end of the clasp-ear 235 has a lug 3251. There is interval between the lug 2351 and the left and right side 233, 234 respectively. The lug 2351 and the left and right side 233, 234 do not joint each other respectively.

A top end of the left and right sides 233, 234 of the second inner frame 22 provides a prop-plate 236 and a clasp-hole 237 respectively which correspond to the outward-bending prop-plate 128 and the clasp-hole 129 of the left and right side 123, 124 of the first inner frame 12 as FIG. 3A shows. The prop-plate 236 is provided for supporting an outer frame of an upper framework. The clasp-hole 237 is provided for fastening a clasp-ear of a bottom of an inner frame of the upper framework.

A first plate 24, a rear side thereof has at least an ear-plate 241; a front side thereof has a hole 242 which corresponds to the screw-hole 225 of the bottom 221 of the second inner frame 22. The ear-plate 241 is bent upward with an adjusted height, and then extended backward along the horizon. The ear-plate 241 can be inserted into the clasp-hole 224 of the bottom 221 of the second inner frame 22, allows the front end of the first plate 24 to use the ear-plate 241 to act as an axis to pivotally connect with the bottom 221 of the second inner frame 22 and press thereof. A front end of the first plate 24 combines with the bottom 221 of the second inner frame 22 and is located under the first hole 222 by uses a screw to pass through the hole 242 of the first plate 24 and firmly fastens into the screw-hole 225 of the second inner frame 22. A hard drive is locked on an upside of the first plate 24. The hard drive can pass through the first hole 222 and to be positioned in the second inner frame 22.

Refer to FIGS. 4, 5A and 5B. The first plate 24 includes a plurality hole 243. The hard drive 251 is locked on an upside of the first plate 24 with screw passing through the hole 243 and corresponding screw hole of the hard drive 251. A plurality of holes 226 of the bottom 221 of the second inner frame 22 rivets to a shaft 252 respectively. An upper end of a plurality of shafts 252 has a screw-hole, to provide for a plurality of screw to pass through a corresponding hole 254 of the motherboard 253 and then to screw into the screw-hole of the shafts 252, and thus the motherboard 253 can be combined with the upper end of the shafts 252. There is a space between the motherboard 253 and the bottom 221 of the second inner frame 22, it is provided for positioning the hard drive 251 and a card reader 255. A right side 234 of the second inner frame 22 has a hole 238 for a screw pass through to fasten a fan 256. The upside of the motherboard 253 combines with electronic components such as an interface card 257. A front side and rear side of a bottom of the outer frame 21 combine with a spring-plate 258, 259 respectively for shielding off an electromagnetic radiation and conforming to a criterion of an electromagnetic wave.

Figure 6:
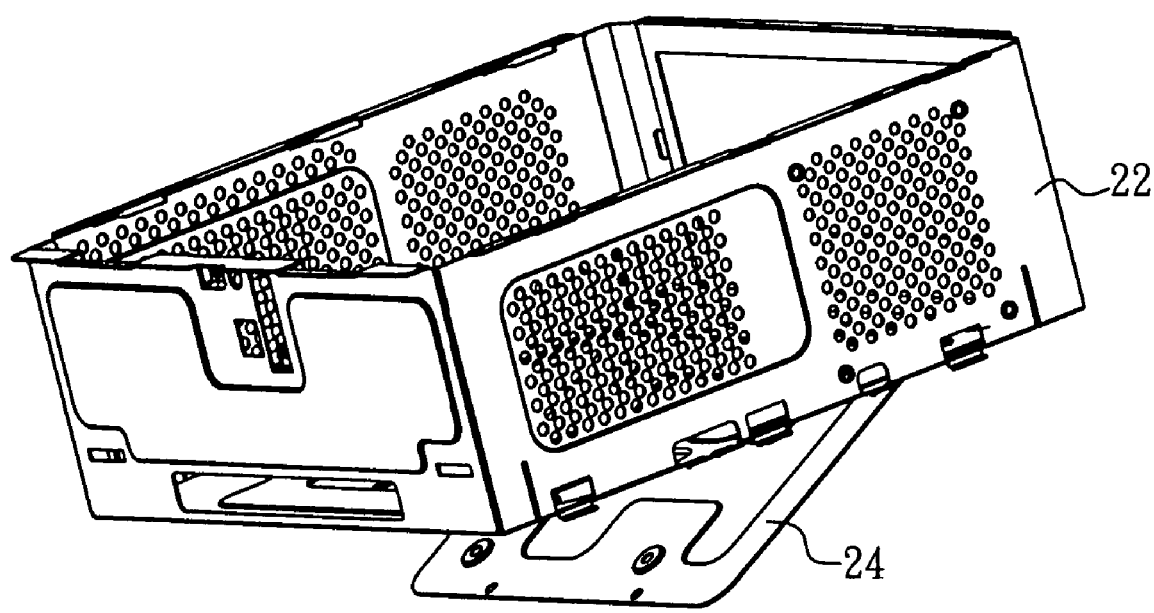
FIG. 6 is a schematic view, showing the first plate of the second framework of a preferred embodiment according to the present invention can lift an angle with some degree.

In the embodiment according to the present invention, allows the hard drive 251 to locate under the motherboard 253, so there is no hard drive 251 to block an upper space of the motherboard 253. The upper space of the motherboard 253 facilitates to integrate electronic parts such as the interface card 257 or for other applications and helps to dispel the heat. Due to the hard drive 251 is located under the motherboard 253, if the hard drive 251 needs to be replaced or repaired, unscrew the screw which is under the first plate 24 and the bottom 221 of the second inner frame 22, and thus the front end of the first plate 24 can be inclined downward as FIG. 6 shows. Further to pull out the first plate 24 to carry out the hard drive 251 for replacement or repair, instead of dismantling the structure of the upper side of the motherboard 253.

Please refer to FIGS. 2, 3A, 3B, 4, 5A and 5B. A upper end and lower end of a junction of a rear end and the left and right side of the second outer frame 21 has a socket 211 and a slot 212 respectively which correspond to the slot 118 of the first outer frame 11 as FIG. 3 shows. The slot 212 is extended to the bottom of the second outer frame 21. The slot 212 is movably combined with a clasp-plate 213. An ear-plate 214 of the clasp-plate 213 is extended to an outside of the slot 212.

When the clasp-ear 135 of the second inner frame 22 is placed on a wider part of a clasp-hole 129 at a rear side of the first inner frame 12, then makes the second inner frame 22 move forward, and then the lug 2351 of the clasp-ear 235 is fastened under the second prop-plate 128 and is placed on an outside of the crevice 1291 of the clasp-hole 129, then pull back the ear-plate 214 and drive the bottom of the clasp-plate 213 to extend to-under the slot 212 to fasten in the slot 118 of the first outer frame 11 allowing the second outer frame 21 cannot be moved backward and the clasp-ear 235 of the second inner frame 22 cannot be detached from the clasp-hole 129 of the first inner frame 12 causes the first framework 10 to steadily fasten the second framework 20 as FIG. 2 shows.

Please refer to FIGS. 1, and 2. The third framework 30, fourth framework 40, and fifth framework 50 include an inner frame which is combined with an inner portion of an outer frame. The outer frame and the inner frame have the same structure as the second outer frame 21 of the second main frame 20 and the second inner frame 22.

According to the embodiment of the present invention, a inner part of The third framework 30, fourth framework 40, and fifth framework 50 can be combined with electronic products such as a DVD drive and hard drive etc respectively or a bottom of the inner part is hollow which can be used for accepting the electronic products projected to an inner space thereof from a layer below it. A through hole at a bottom of an inner frame can be used for communicating with the lower framework. Therefore, wires can be routed to each framework to facilitate all electronic devices. Such wires can be directly routed to the power supply of the first framework or the motherboard of the second framework. Wires are hidden in the outer frame of each framework thus they do not affect the entire modular computer design. The inner portion of each framework provides a corresponding combination structure which being hidden in the outer frame causes the computer main frame shows a more consistent outward appearance.

A framework structure for a computer main frame according to the present invention allows the hard drive to be combined on the back of a motherboard. It provides a convenient way of spatial allocation for an upper side of the motherboard and a convenient maintenance or replacement for a hard drive. A framework structure for a computer main frame according to the present invention facilitates to combine each framework securely.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A framework structure for a computer main frame comprising;
    an outer frame;
    an inner frame, which is combined with and surrounded by an inner portion of the outer frame, a bottom thereof having a first hole and a plurality of holes;
    a first plate, a rear end thereof is pivotally connected to a bottom of the inner frame;
    a front end thereof is combined with a downside of the bottom of the inner frame and positioned on a downside of the first hole of the inner frame;
    whereby, a hard drive is allowed to be combined on the upper side of the first plate and to be passed through the first hole and to be positioned in an inner portion of the inner frame;
    a plurality of shafts, bottoms thereof are respectively combined with the holes on the bottom of the inner frame so as to use upper ends of the shafts to combine with an undersurface of a motherboard to allow the hard drive to be positioned to directly underlie the motherboard;
    wherein the bottom of the inner frame includes at least a clasp-hole and a plurality of screw-holes; the rear end of the first plate includes an ear-plate; the front end of the first plate includes a hole which corresponds to the screw-hole of the bottom of the inner frame; the first elate includes another hole which corresponds to the screw-hole of a hard drive; whereby screws are utilized to combine the hard drive onto an upper side of the first plate; the ear-plate is inserted into the clasp-hole of the bottom of the inner frame; allows the front end of the first plate to use the ear-plate to act as an axis to pivotally connect with the bottom of the second inner frame and press the bottom of the inner frame; whereby plurality of screws are utilized to pass through the hole of the first plate, and be firmly fastened to the screw-hole of the inner frame;
    wherein an inner portion of a top cud and a bottom of the framework provides a corresponding combination structure respectively; whereby the framework combines other framework via the combination structure; the combination structures are hidden in the frameworks;
    wherein the combination structure of a top end of an inner portion of the framework includes clasp-holes and first slots, the clasp-holes are placed on the top end of a left and right sides of the framework respectively and the first slots are placed on the top end of a rear sides of the framework; the combination structure of the inner portion of a bottom of the framework includes clasp-ears and second slots, the clasp-ears are placed on the bottom of the left and right sides of the framework respectively and the second slots are placed on the bottom of the rear sides of the framework, wherein, the second slots are extended to the bottom of the framework; the second slots movably combines a clasp-plate; the clasp-plate includes an ear-plate; the clasp-ear is extended to the outside of the second slot; when the ear-plate is fasten into the clasp-hole of other framework, and the ear-plate is pulled to drive a bottom of the clasp-plate to extend under a second slot, and then fasten to a first slot of other framework cause the framework and the other framework can be combined together.

2. The framework structure for a computer main frame according to claim 1, wherein the clasp-holes are placed on a top end of a left and right sides of the inner frame respectively and the first slots are placed on a top end of a rear sides of the outer frame; the clasp-ears are placed on a bottom of a left and right sides of the outer frame and the second slots are placed on the bottom of the rear sides of the outer frame.

3. The framework structure for a computer main frame according to claim 2, wherein the top end of the left and right sides of the inner frame include a prop-plate which is bended outward; a junctions of the prop-plate and the left and right sides of the inner frame have clasp-holes respectively; a front end of the clasp-holes is narrow to form a crevice; a rear end of the clasp-holes is wider used for holding a clasp-ear of other framework; the clasp-ear includes a lug at the front end thereof; there is interval between the left and right sides of the inner frame and the lug respectively; whereby the lug is fasten under a prop-plate of an other framework, and the lug is placed on an outside of the crevice which is in a front of a clasp-hole of the other framework.

4. The framework structure for a computer main frame according to claim 3, wherein the second slots and the slot-holes are placed on a junction of a rear end and a left and right sides of the outer frame.

5. The framework structure for a computer main frame according to claim 4, wherein the inner frame includes at least a second hole at the bottom thereof which can be pass through wires.

6. The framework structure for a computer main frame according to claim 4, wherein the outer frame includes a plurality of fins at the inside thereof; the plurality of fins respectively uphold the inner frame.

* * * * *